United States Patent
Will, IV et al.

(10) Patent No.: US 11,316,385 B2
(45) Date of Patent: Apr. 26, 2022

(54) WIRELESS ENERGY TRANSFER

(71) Applicant: International Business Machines Corporation, Armonk, NY (US)

(72) Inventors: Henry C. Will, IV, Dover, NJ (US); Jarrod R. Anderson, Sammamish, WA (US); Timothy J. Hahn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 16/202,020

(22) Filed: Nov. 27, 2018

(65) Prior Publication Data

US 2020/0169125 A1    May 28, 2020

(51) Int. Cl.
*H02J 50/80* (2016.01)
*B60L 53/66* (2019.01)
*B60L 53/30* (2019.01)

(52) U.S. Cl.
CPC .......... *H02J 50/80* (2016.02); *B60L 53/305* (2019.02); *B60L 53/665* (2019.02)

(58) Field of Classification Search
CPC ........ H02J 50/80; H02J 2310/48; H02J 50/00; B60L 53/665; B60L 2230/16; Y04S 30/14; Y02T 90/12; Y02T 10/7072; Y02T 10/70; Y02T 90/167; G06Q 50/06
See application file for complete search history.

(56) References Cited

U.S. PATENT DOCUMENTS

| | | | | |
|---|---|---|---|---|
| 8,024,012 B2 * | 9/2011 | Clevenger | ............... | H02J 50/00 455/572 |
| 8,175,660 B2 * | 5/2012 | Porwal | ..................... | H02J 7/025 455/573 |
| 8,536,736 B2 * | 9/2013 | Abramo | ................... | H02J 7/025 307/104 |
| 9,711,998 B2 * | 7/2017 | Nakano | .................... | H02J 50/20 |
| 9,744,870 B2 * | 8/2017 | Cronie | ..................... | B60L 53/38 |
| 9,774,208 B2 * | 9/2017 | Qian | ........................ | H02J 7/025 |
| 9,843,196 B2 * | 12/2017 | Kwak | ................. | H02J 7/00308 |
| 10,022,614 B1 * | 7/2018 | Tran | ........................ | G16H 50/70 |
| 10,103,552 B1 * | 10/2018 | Leabman | ................ | H02J 50/20 |
| 10,239,414 B2 * | 3/2019 | Araki | ....................... | H02J 7/025 |
| 2003/0009401 A1 * | 1/2003 | Ellis | ........................ | G06Q 30/04 705/35 |
| 2006/0052918 A1 * | 3/2006 | McLeod | ................ | G07C 5/008 701/22 |

(Continued)

OTHER PUBLICATIONS

He et al., Integrated pricing of roads and electricity enabled by wireless power transfer, Journal Article Date: 2013, Publication Ttl: Transportation Research Part C—Emerging Technologies, vol. 34, pp. 1-15, 2013.

*Primary Examiner* — Jared Fureman
*Assistant Examiner* — Michael J Warmflash

(57) ABSTRACT

An example operation may include one or more of determining an energy state of a system, generating a wireless energy transfer request based on the energy state, transmitting the wireless energy transfer request to another system, receiving wireless energy transfer information from the other system, performing a wireless energy exchange with the other system based on the wireless energy transfer information, and receiving a data block associated with the wireless energy exchange from the other system.

20 Claims, 15 Drawing Sheets

100

(56) References Cited

U.S. PATENT DOCUMENTS

| | | | | |
|---|---|---|---|---|
| 2009/0108679 | A1* | 4/2009 | Porwal | H02J 50/20 307/104 |
| 2009/0304101 | A1* | 12/2009 | LoPorto | B60L 3/14 455/70 |
| 2012/0091972 | A1* | 4/2012 | Narel | H02J 7/007 320/162 |
| 2012/0197693 | A1* | 8/2012 | Karner | B60L 53/31 705/14.1 |
| 2012/0290470 | A1* | 11/2012 | Lee | G06Q 20/3278 705/39 |
| 2013/0082653 | A1* | 4/2013 | Lee | H02J 50/20 320/108 |
| 2013/0091225 | A1* | 4/2013 | Eaton | H02J 7/00 709/206 |
| 2013/0262197 | A1* | 10/2013 | Kaulgud | H02J 3/14 705/14.1 |
| 2013/0311798 | A1* | 11/2013 | Sultenfuss | H04B 5/0037 713/310 |
| 2014/0028093 | A1* | 1/2014 | Aikawa | H04B 5/0037 307/11 |
| 2014/0361728 | A1* | 12/2014 | Qian | H02J 50/40 320/106 |
| 2014/0361739 | A1 | 12/2014 | Kwak et al. | |
| 2015/0188322 | A1* | 7/2015 | Lee | H02J 5/005 307/104 |
| 2015/0302668 | A1* | 10/2015 | Yuasa | H04L 67/12 701/29.1 |
| 2015/0303714 | A1* | 10/2015 | Keeling | B60L 53/122 320/108 |
| 2016/0087691 | A1* | 3/2016 | Van Wageningen | H02J 50/12 307/104 |
| 2016/0129793 | A1* | 5/2016 | Cronie | B60L 53/126 320/109 |
| 2016/0372963 | A1* | 12/2016 | Sankar | H02J 50/80 |
| 2017/0005520 | A1* | 1/2017 | Zeine | H02J 50/20 |
| 2017/0126070 | A1* | 5/2017 | Lee | H02J 50/12 |
| 2017/0238840 | A1* | 8/2017 | Hyde | H02J 50/00 |
| 2017/0337552 | A1* | 11/2017 | Mandal | G06Q 20/326 |
| 2017/0355271 | A1* | 12/2017 | Cronie | B60L 53/12 |
| 2018/0130130 | A1* | 5/2018 | Dechu | G06Q 40/04 |
| 2018/0131240 | A1* | 5/2018 | Alperin | H02J 3/008 |
| 2018/0205256 | A1* | 7/2018 | Kwon | H02J 50/12 |
| 2018/0254637 | A1* | 9/2018 | Abate | H04L 9/0637 |
| 2019/0047427 | A1* | 2/2019 | Pogorelik | B60L 53/665 |
| 2019/0077519 | A1* | 3/2019 | Husain | B64C 39/024 |
| 2019/0130451 | A1* | 5/2019 | Logvinov | G06Q 30/0272 |
| 2019/0275894 | A1* | 9/2019 | Amacker | G06Q 20/145 |
| 2019/0299802 | A1* | 10/2019 | Neubecker | H02J 7/0027 |
| 2019/0311443 | A1* | 10/2019 | Blades | G01D 4/002 |
| 2019/0362446 | A1* | 11/2019 | Navarro | H04L 41/00 |
| 2019/0378220 | A1* | 12/2019 | Ibrahim | G06Q 20/18 |
| 2020/0044485 | A1* | 2/2020 | Smith | H02J 50/50 |
| 2020/0076198 | A1* | 3/2020 | Beckmann | H04L 9/0637 |
| 2020/0122595 | A1* | 4/2020 | Nonnenmacher | G06Q 10/06315 |

* cited by examiner

640

US 11,316,385 B2

WIRELESS ENERGY TRANSFER

TECHNICAL FIELD

This application generally relates to a database storage system, and more particularly, to wireless energy transfer.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by a centralization of information, such as energy transfer data, that may be not be fully accessible to devices or nodes that may have a need to access or alter such data stored in a centralized database. Mobile devices, such as smartphones and vehicles, may be especially susceptible to difficulties accessing a centralized database due to, for example, mobile network connectivity problems. Therefore, what is needed is a solution to overcome these significant drawbacks.

SUMMARY

One example embodiment provides a system that includes a processor and memory, wherein the processor is configured to perform one or more of receive wireless energy transfer information and a data block, transmit a wireless energy transfer request, store the wireless energy transfer information and the data block, determine an energy state of the system, generate, based on the energy state of the system, the wireless energy transfer request, and determine, based on the wireless energy transfer information, to perform a wireless energy exchange with a second system.

Another example embodiment provides a method that includes one or more of determining an energy state of the system, generating a wireless energy transfer request based on the energy state, transmitting the wireless energy transfer request to a second system, receiving wireless energy transfer information from the second system, performing a wireless energy exchange with the second system based on the wireless energy transfer information, and receiving a data block associated with the wireless energy exchange from the second system.

A further example embodiment provides a non-transitory computer readable medium comprising instructions, that when read by a processor, cause the processor to perform one or more of determining an energy state of the system, generating a wireless energy transfer request based on the energy state, transmitting the wireless energy transfer request to a second system, receiving wireless energy transfer information from the second system, performing a wireless energy exchange with the second system based on the wireless energy transfer information, and receiving a data block associated with the wireless energy exchange from the second system.

DETAILED DESCRIPTION

Figure 1:
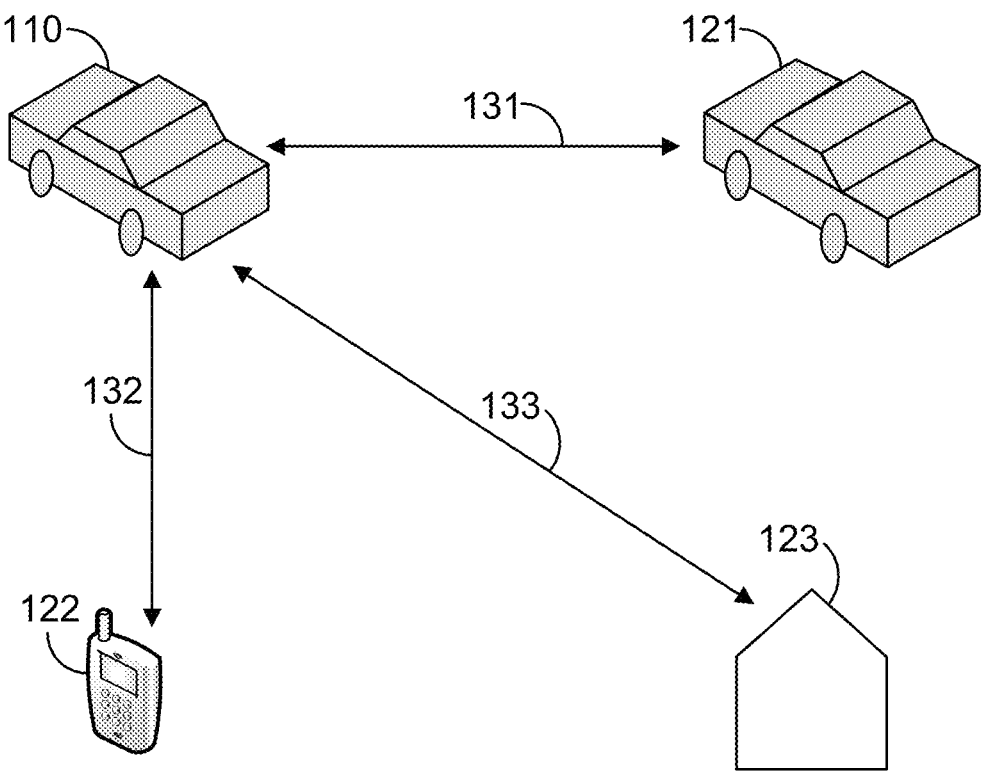
FIG. 1 illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide wireless energy transfer and exchange facilitated by one or more decentralized databases.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange value, funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the stored current state resulting from applying all transactions from the initial blockchain transaction, including the most recent blockchain transaction, and which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and/or updates that remove key value pairs from a world state or otherwise alter a world state, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all key value pairs that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, and therefore can be regenerated from the chain at any time. The state database may automatically be recovered (or generated if needed) upon peer node startup, and before transactions are accepted.

Some benefits of the instant solutions described and depicted herein include facilitating the acquisition of energy by a mobile device or vehicle that may need or desire additional energy. In particular, the instant solutions facilitate the exchange of value for energy that may be used in energy acquisition by systems and devices, including, but not limited to, mobile devices and vehicles. Such energy may be acquired, by systems or devices such as mobile devices or vehicles, from another system or device, mobile or stationary, such as a mobile device or vehicle, or a stationary, fixed, or otherwise non-mobile device or system.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, exchanges related to energy transfers, and the recording, altering and retrieval of data associated therewith, is implemented using smart contracts and/or similar systems and methods. Such systems and methods are implemented with the decentralized, accountable, and immutable characteristics that are inherent and unique to blockchain. In particular, in an example implementation, a smart contract for energy transfer may be negotiated between two devices or systems, either or both of which may be mobile or stationary, and the transaction may be recorded in a decentralized database using blockchain. Energy transfers can be transfers of electrical energy, transfers of fuel for generating energy (e.g., gasoline, natural gas, diesel fuel, etc.), or any combination thereof.

One of the benefits of the example embodiments is that it improves the functionality of a mobile system by providing a way for a mobile system to obtain energy and exchange value (e.g., money, credit, funds, securities, currency, virtual currency, goods, virtual goods, etc.) for such energy. Another benefit is that it provides for a decentralized database in which to store a record, such as a blockchain, of an energy transaction. Through the blockchain system described herein, mobile systems can offer and agree on contractual terms for an exchange of energy for value and record the transaction in a decentralized database using blockchain, creating an accurate, immutable, and publicly available record of the exchange.

The example embodiments provide numerous benefits over a traditional database. For example, through the blockchain the embodiments provide an accurate, immutable, and publicly available record of an exchange of energy for value between a vehicle or mobile device and another system. Meanwhile, if a traditional database were used to implement the example embodiments, the example embodiments would suffer from unnecessary drawbacks such as inaccurate or outdated information due to hindered access to a centralized database of energy exchange data. Access to such a centralized database may be due to any number of factors, including the typical issues that may befall networks that service wireless mobile devices. Accordingly, the example embodiments provide for a specific solution to a problem in the field of energy transfer exchanges.

The example embodiments also change how data may be stored within a block structure of the blockchain. For example, terms of an energy for value exchange may be presented to or otherwise facilitated using a blockchain fabric, while energy transfer data may be stored within a data segment of a data block, which may be identifiable based on metadata and/or a header of such a data block. By storing energy transfer data within data blocks of a blockchain, the energy transfer data may be appended to an immutable ledger through a hash-linked chain of blocks.

FIG. 1 illustrates a diagram of an example energy exchange system using blockchain according to example embodiments. Referring to FIG. 1, the example 100 includes a vehicle 110 that may communicate wirelessly with another vehicle 121. Vehicles 110 and 121 may function as nodes in a blockchain system. The vehicle 110 may communicate 131 with the vehicle 121 to agree to exchange power for some value (e.g., money, credit, funds, securities, currency, virtual currency, goods, virtual goods, etc.). The communication 131 may include a negotiation over an amount of power, a time of power transfer, and a value to exchange for the power. Upon agreement to perform the exchange, and/or upon completion of the exchange, a record of the exchange may be generated and recorded in a decentralized database as, for example, a blockchain. Alternatively, the communication 131 may include a negotiation over an amount of power, a time of power transfer, and a value to exchange for the power, but may result in no exchange of power because, for example, the vehicle 110 and the vehicle 121 are unable to agree on an exchange. Note that the vehicle 110 is a representation of any device or system that may be configured to engage in wireless energy transfer exchanges.

According to example embodiments, a mobile device or vehicle, such as the vehicle 110, may engage in wireless energy transfer and exchange with a mobile device, such as mobile device 122, a vehicle, such as vehicle 121, or a stationary system, such as building 123. Like the vehicles 110 and 121, the mobile device 122 and the building 123 may function as nodes in a blockchain system. For example, the vehicle 110 may communicate 132 with the mobile device 122 to agree to exchange power for a value. The communication 132 may include a negotiation over an amount of power, a time of power transfer, and a value to exchange for the power. In another example, the vehicle 110 may communicate 133 with the building 123 to agree to exchange power for a value. The communication 133 may include a negotiation over an amount of power, a time of power transfer, and a value to exchange for the power. Upon agreement to perform either such exchange, and/or upon completion of either such exchange, a record of the exchange may be generated and recorded in a decentralized database as, for example, a blockchain. Here again, either or both of the communications 132 and 133 can result in no exchange of power because the vehicle 110 and either or both of mobile device 122 and building 123, respectively, are unable to agree on an exchange.

Any of the communications 131, 132, and 133 may occur wirelessly. Such communications may utilize near field communications (NFC) for direct wireless communications. Other methods of wireless communications can be used in the disclosed embodiments, such as other direct wireless communications methods, via a wireless network, or via a combination of wireless and wired networks. Any of the communications 131, 132, and 133 may occur directly between the devices or may take place via an intermediary, such as a blockchain platform, asset exchange server, database server, or any other one or more intermediary devices.

Figure 2A:
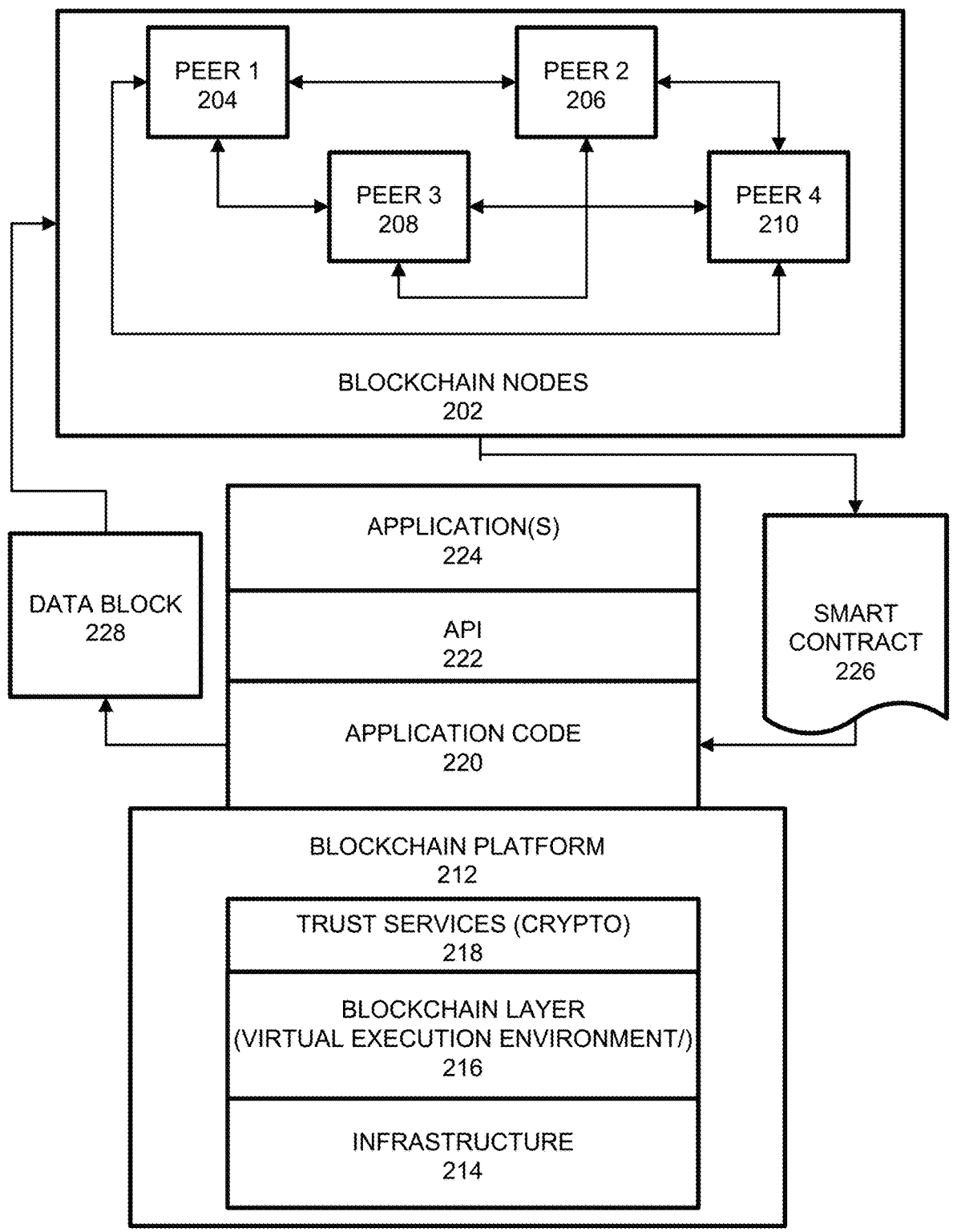
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as a blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may represent or indicate one or more aspects of a wireless energy exchange and may be processed by one or more processing entities (e.g., virtual machines) included in the blockchain layer 216. The result may be indicated by data block 228, which may indicate one or more of an energy amount, a value to exchange for the energy, data indicating one or both parties to a wireless energy exchange, a time of exchange, and/or any other data associated with wireless energy transfer and exchange. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a smart contract 226 may be created, entered into, or otherwise determined that sets forth parameters for a wireless energy exchange. The smart contract 226 may be executed and the exchange may be performed. Upon completion of the exchange, for example when energy has been transferred from one system/device (e.g., a vehicle) to another, a block chain data block 228 may be generated by architecture 200. Data block 228 may be generated reflecting the exchange of energy as represented by smart contract 226. Data block 228 may be a data block representing the transfer of energy, a data block representing the transfer of value, or a data block representing both. Where data block 228 represents a transfer of value, another data block may be used to represent an associated transfer of energy. Data block 228 (and any other data blocks associated with the exchange) may be provided to one or more of the nodes 204-210.

Figure 2B:
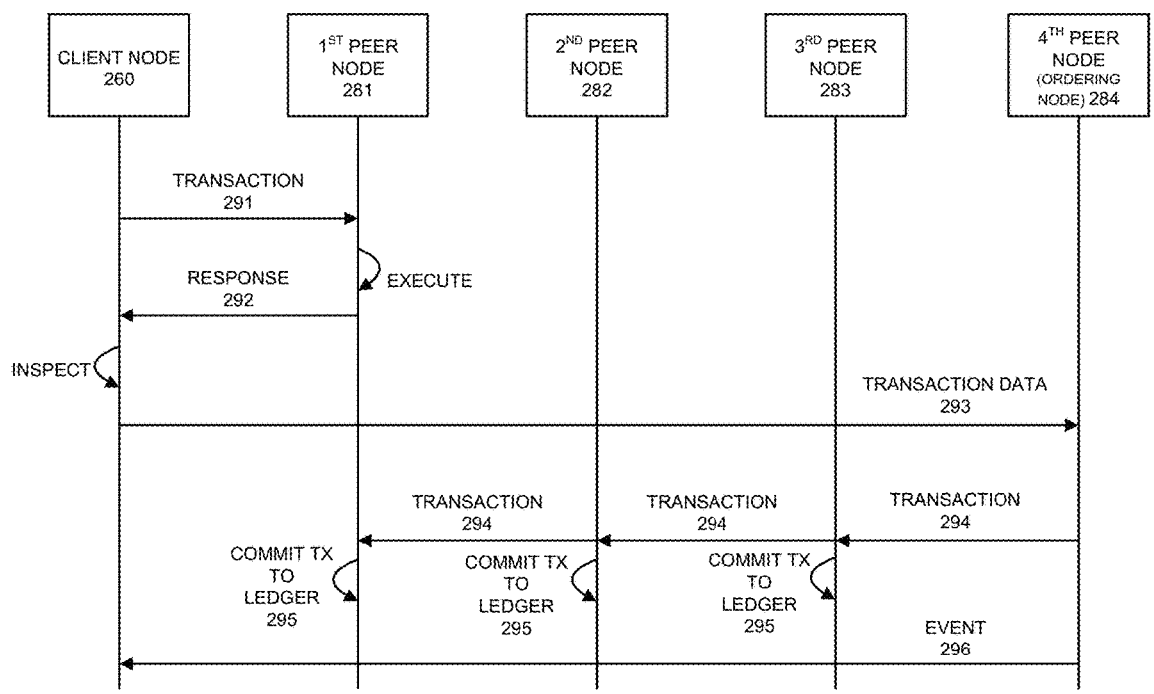
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event 296 is emitted and received (e.g., from any node) to notify the client application that the transaction (invocation) has been immutably appended to the chain, as well as to notify whether the transaction was validated or invalidated.

Figure 3:
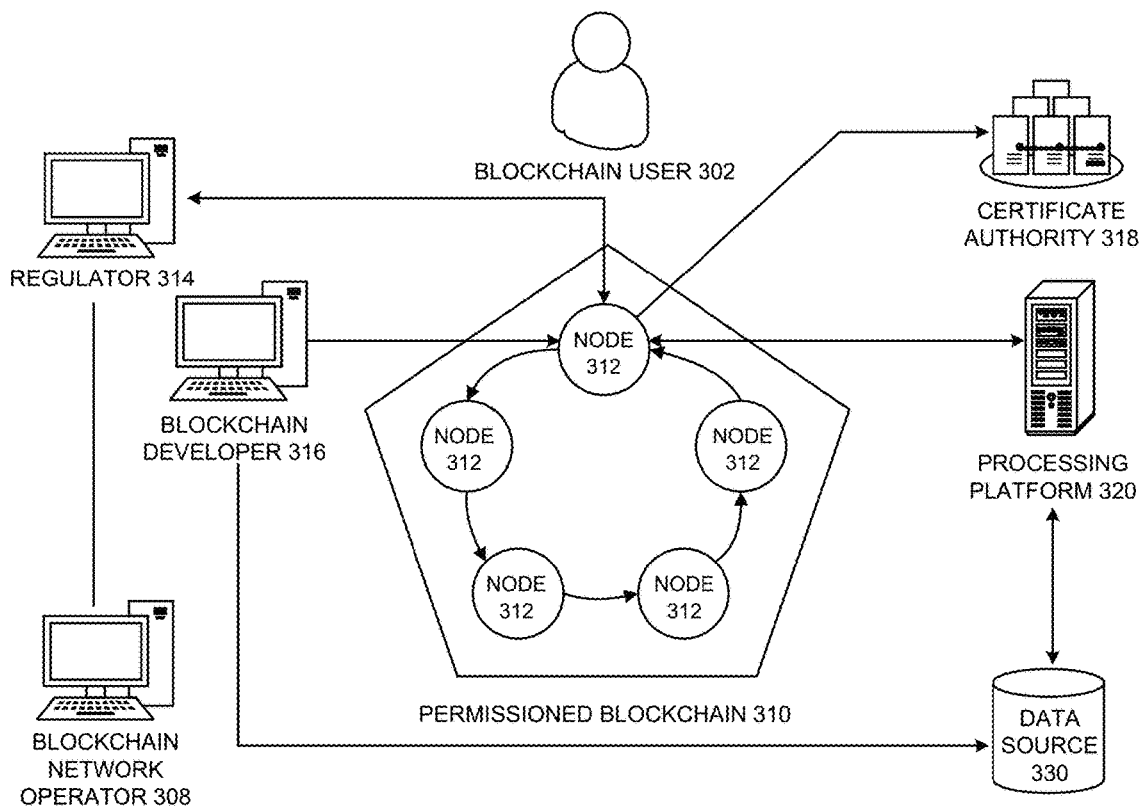
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
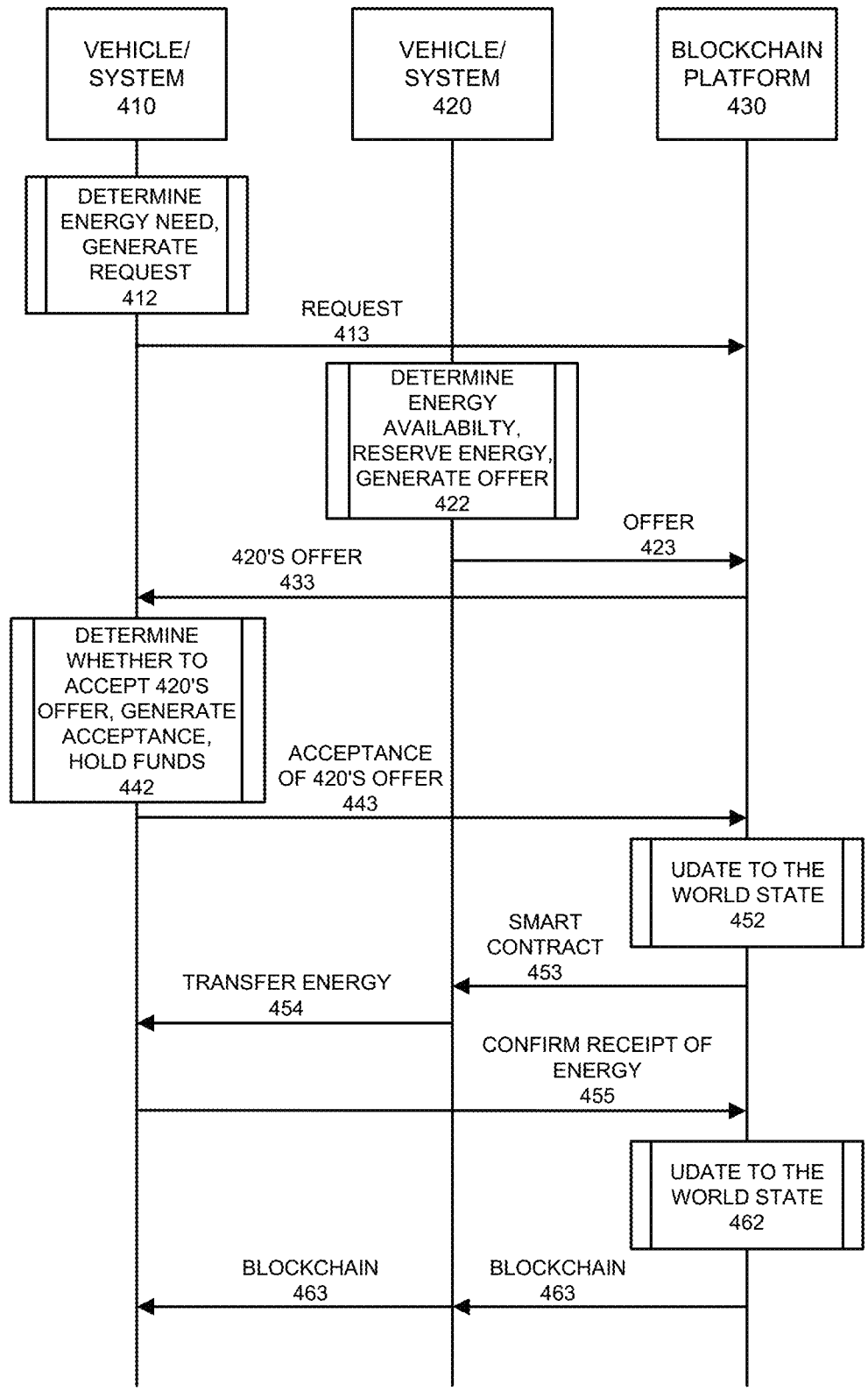
FIG. 4 illustrates a system messaging diagram, according to example embodiments.

FIG. 4 illustrates a system messaging diagram for engaging in wireless energy transfer and exchange according to example embodiments. Referring to FIG. 4, the system diagram 400 includes a vehicle/system 410 that may be any vehicle, mobile device, mobile system, stationary device, or stationary system that may acquire energy. The system diagram 400 also includes a vehicle/system 420, which may also be any vehicle, mobile device, or mobile system that may acquire energy, but may also be any stationary device or system capable of providing energy. The system diagram 400 also includes a blockchain platform 430 that represents any one or more platforms that may facilitate and/or perform blockchain functions and processes.

The vehicle/system 410 may determine that it needs or desires energy at 412 and may send a request for energy 413 to the blockchain platform 430. The request 413 may indicate a number or range of units of energy desired and/or a value or range of values the vehicle/system 410 is willing to exchange for such units of energy. The request 413 may also, or instead, indicate a total amount of energy desired and/or a window of time during which vehicle/system 410 would like to receive the requested energy and/or a value that vehicle/system 410 is willing to exchange for a total amount of energy.

The vehicle/system 420 may determine that it has energy available for transfer at 422 and may send an offer to transfer energy 423 to the blockchain platform 430. The offer 423 may indicate a number or range of units of energy desired and/or a value or range of values the vehicle/system 420 is willing to exchange for such units of energy and/or a window of time during which the vehicle/system 420 is willing to receive an acceptance of its offer. The offer 423 may also, or instead, indicate a total amount of energy available for transfer and/or a window of time during which vehicle/system 420 is available to transfer energy.

The blockchain platform 430 may transmit an indication of the vehicle/system 420's offer 433 to the vehicle/system 410. The communication 433 may be a transmission to one or more vehicles and/or systems that may have an interest in acquiring energy known by the blockchain platform 430 or may be a broadcast transmission to all vehicles and systems that may communicate with the blockchain platform 430, or any subset thereof.

The vehicle/system 410 may determine whether to accept the offered energy at 442 and may generate an acceptance transmitted to the blockchain platform 430 in communication 443. The vehicle/system 410 may also, at 442, place a hold on the value (e.g., money, credit, funds, securities, currency, virtual currency, goods, virtual goods, etc.) to be used in exchange for the energy. The acceptance 443 may indicate a number or range of units of energy desired and a value for which the vehicle/system 410 is willing to exchange such units of energy, in some embodiments, reflecting the terms offered in offers 423 and 433. The acceptance 443 may also indicate that a hold has been placed on the value to be used to pay for the energy, in some embodiments, providing a verifiable indicator of such a hold.

The blockchain platform 430 may create an update to the world state 452 reflecting the exchange of energy and value between the vehicle/system 410 and the vehicle/system 420. The update to the world state, or an indication thereof, may be sent to the vehicle/system 420 at communication 453. The smart contract and/or communication 453 may provide an indication of confirmation that payment has been placed on hold for the energy offered for transfer.

The vehicle/system 420 may transfer energy 454 using any wireless energy transfer technology. The vehicle/system 410 may, upon receipt of the energy transfer from vehicle/system 420, send a confirmation of receipt of the energy via communication 455 to the blockchain platform 430. Communication 455 may include indications of the associated smart contract, a number of units of energy, a time of energy transfer, a value per unit of energy exchanged, and/or a total value exchanged for the transferred energy. Communication 455 may include an indication that payment has been, will be, or is in progress, for the energy.

The blockchain platform 430 may, at 462, generate and store an update to the world state on the blockchain 463 with one or more data blocks reflecting the exchange represented by the update generated at 452. The update may be transmitted to the vehicle/system 410, the vehicle/system 420, and any other vehicles and systems in communications with the blockchain platform 430, or any subset thereof.

Figure 5A:
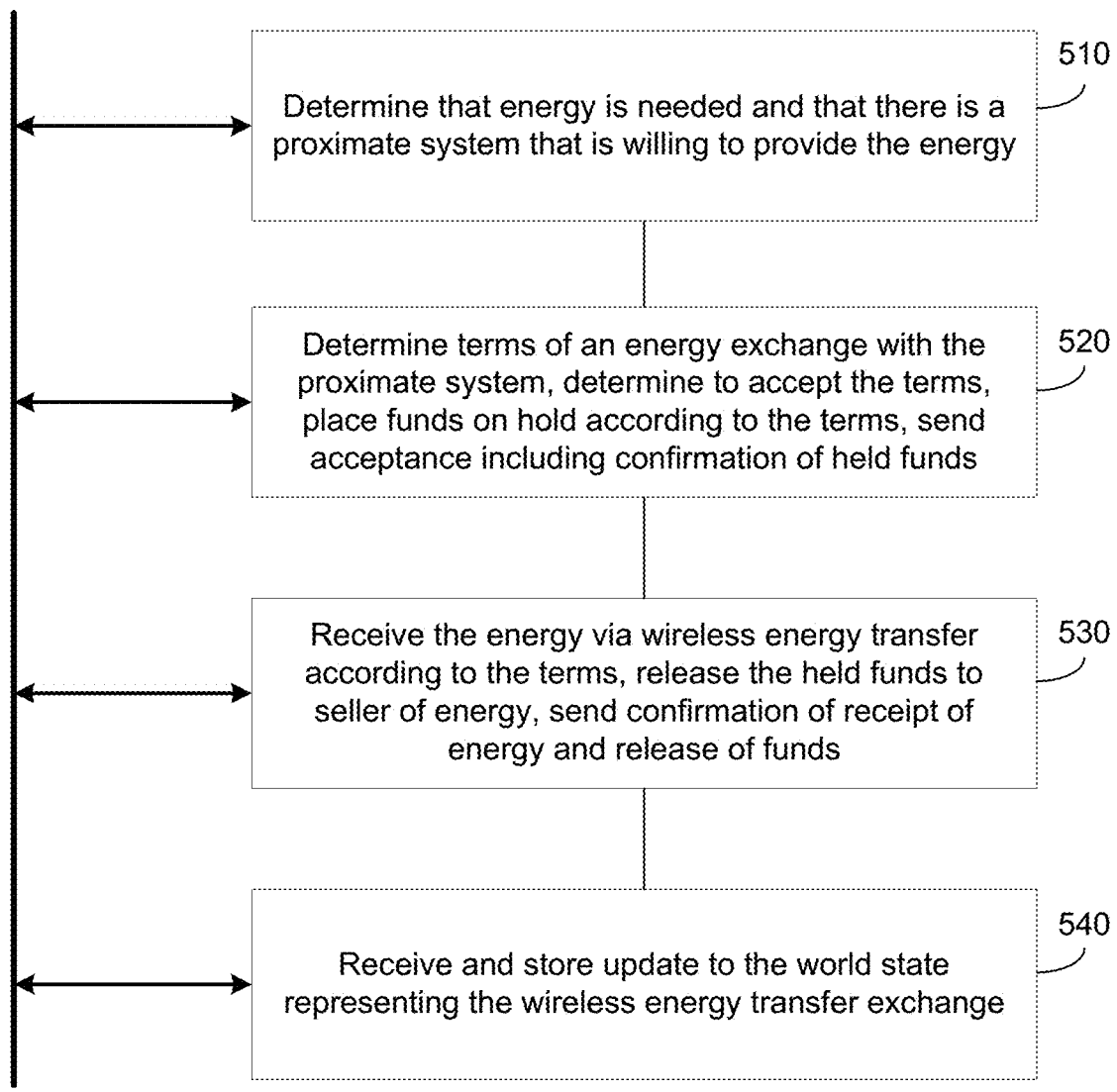
FIG. 5A illustrates a flow diagram, according to example embodiments.

FIG. 5A illustrates a flow diagram 500 of an example method of engaging in wireless energy transfer and exchange using a blockchain, according to example embodiments. Referring to FIG. 5A, the method 500 may be performed by a vehicle, system, or other device that may be mobile and that may require energy. At 510, such a device may determine that energy is needed or desired. The device may send a notice to another system, such as a blockchain platform or associated system, that it needs energy. The device of method 500 may determine at 510 that there is a nearby or proximate system that is willing and able to provide such energy, for example by, in part, receiving one or more notifications that indicate such a nearby system is available and/or the location of such a nearby system. Communications, including any indications and notifications of method 500, may facilitated by a blockchain platform and/or by a system supporting or associated with a blockchain platform.

At 520, the device of method 500 may determine the terms of the energy exchange and may determine to accept such terms. These terms may be included or indicated by the notifications that were received at 510. The device of method 500 may place an amount value (e.g., money, credit, funds, securities, currency, virtual currency, goods, virtual goods, etc.) on "hold," thus reserving such value for use in the exchange. The device of method 500 may send an acceptance of the offer of exchange to the blockchain platform or associated system, which may include an indication of confirmation that the value has been placed on hold according to the terms of the exchange. This acceptance can be used to create a smart contract, or further the completion of a smart contract, by the blockchain platform and/or by the system supporting or associated with a blockchain platform.

At 530, the device of method 500 may receive the energy offered via a wireless energy transfer. Upon receipt of the energy or upon completion of the transfer of energy, the device of method 500 may release the value on hold to the system providing the energy. The device may also send a confirmation of receipt of the energy and release of the value at 530. At 540, the device of method 500 receives and stores an update to the world state associated with the smart contract indicating the completion of the exchange and/or the fulfilment of the smart contract.

Figure 5B:
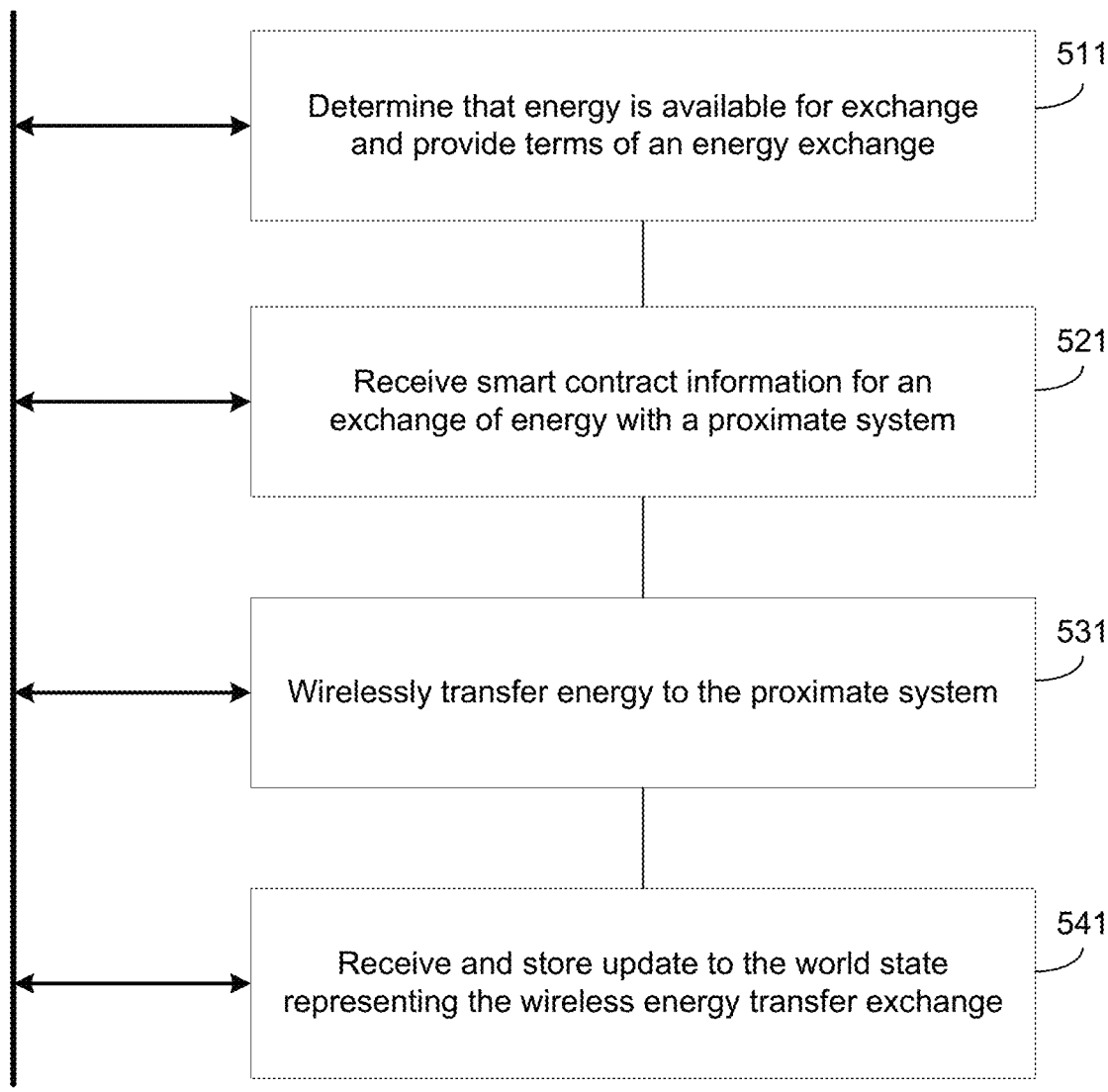
FIG. 5B illustrates a further flow diagram, according to example embodiments.

FIG. 5B illustrates a flow diagram 501 of an example method of engaging in wireless energy transfer and exchange using a blockchain, according to example embodiments. Referring to FIG. 5B, the method 501 may be performed by a vehicle, system, or other device that may be mobile or stationary and that may have energy available to transfer to a mobile device or system, such as a vehicle. At 511, such a system may determine that it has energy that is available for exchange and may determine the terms under which it is willing to exchange the energy. The system may send a notice to another system, such as a blockchain platform or associated system, of such terms. Communications, including any indications and notifications of method 501, may facilitated by a blockchain platform and/or by a system supporting or associated with a blockchain platform.

At 521, the system of method 501 may receive information indicating that terms of its exchange have been accepted by a mobile device or system. In some embodiments, this information may be in the form of a smart contract or an indication of a smart contract. This information may confirm to the system of method 501 that value (e.g., money, credit, funds, securities, currency, virtual currency, goods, virtual goods, etc.) has been reserved for the exchange. This information may include an indication of the accepting mobile device or system, or otherwise provide information needed to transfer energy wirelessly to the accepting mobile device or system. At 531, the system of method 501 may wirelessly transfer the energy to the accepting mobile device or system. At 541, the system of method 501 receives and stores an update to the world state associated with the smart contract indicating the completion of the exchange and/or the fulfilment of the smart contract.

Figure 5C:
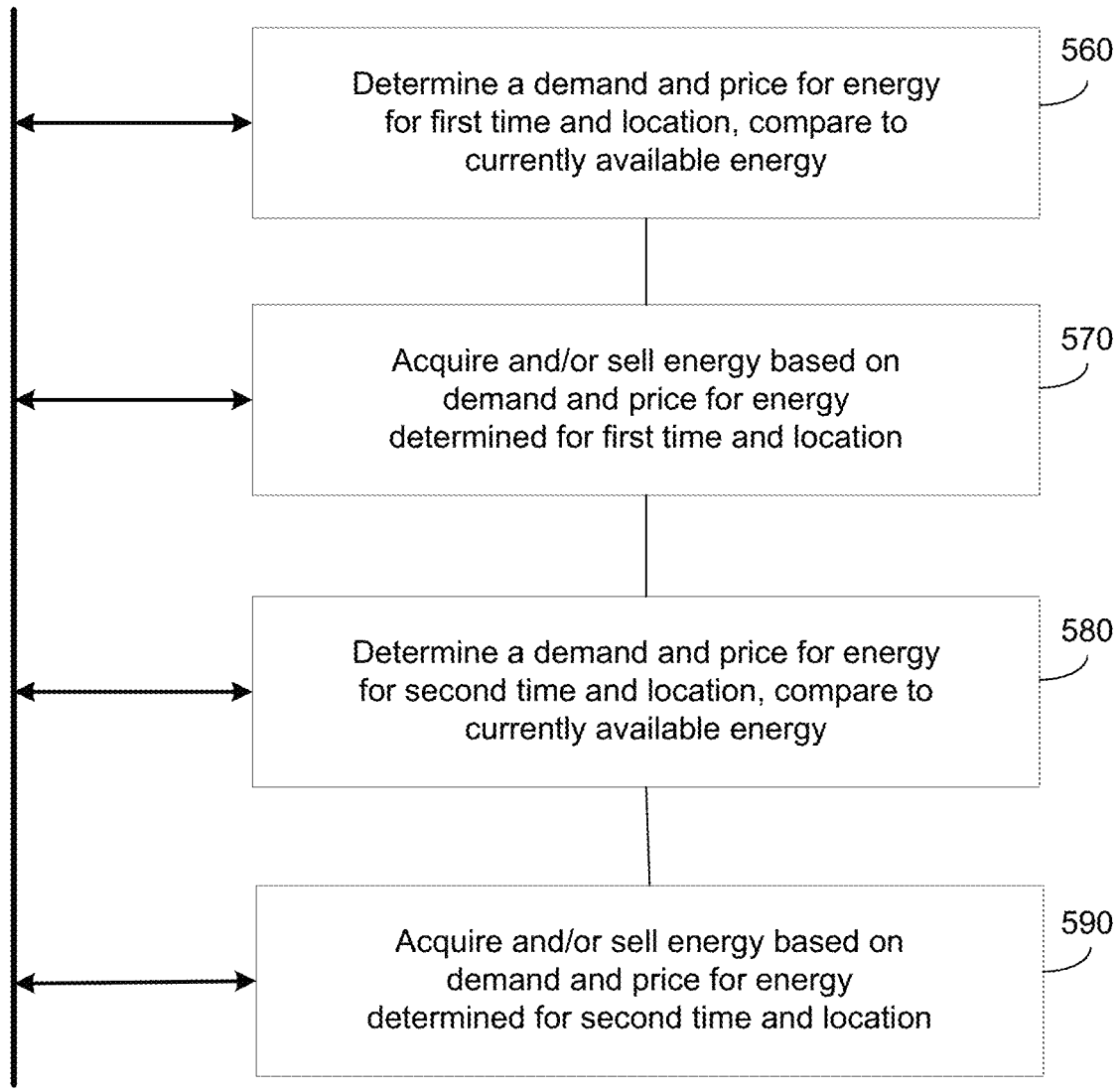
FIG. 5C illustrates a further flow diagram, according to example embodiments.

FIG. 5C illustrates a flow diagram 550 of an example method of engaging in wireless energy transfer and exchange using a blockchain, according to example embodiments. Referring to FIG. 5C, the method 550 may be performed by a vehicle, system, or other device that may be mobile and that may acquire and/or transfer energy. At 560, such a device may determine a demand or value for energy at its current (first) time and location (in some examples, on its own based on data determined from its environment or from communications such as advertisements or solicitations) and compare that information to its own energy status. Such determinations may be may using information received from or via a blockchain platform, smart contract platform, or a system associated therewith. The device may determine whether to offer for sale its own energy and/or to offer to purchase energy from another device. This determination may be based on the terms under which the device acquired the energy it currently has. For example, the device may determine that it has excess energy purchased at a lower value than the value supported by the demand in its current location, and therefore may determine to offer some of its energy in exchange for value. Based on such determinations made at 560, at 570 such a device may engage in wireless energy transfer and exchange as disclosed herein, entering into and competing one or more smart contract memorialized using blockchains.

As the demand for energy may change based on time and location, at 580, such a device may determine a demand or value for energy at a subsequent (second) time and location and compare that information to its own energy status. Such determinations may be may using information received from or via a blockchain platform, smart contract platform, or a system associated therewith. The device may determine whether to offer to exchange some of its own energy for value and/or to offer to exchange value for energy from another device. This determination may be on the terms under which is acquired the energy it currently has. For example, the device may determine that it has excess energy purchased at a lower value (for example, at the first time and location) than the value supported by the demand in its subsequent, second location, and therefore may determine to offer some of its energy in exchange for value. This determination may be based on data associating values per unit of energy currently held by the device. Each value associated with a unit of energy currently held by the device may vary from other values associated with other units of energy, for example, depending on the time, place, and/or terms under which a unit of energy was acquired. Based on such determinations made at 580, at 590 such a device may engage in wireless energy transfer and exchange as disclosed herein, entering into and completing one or more agreements to transfer energy memorialized using transactions stored in, or represented by, blockchains.

In the disclosed embodiments, determinations regarding sale and acquisition of energy may be made automatically and rapidly using the disclosed systems and methods. For example, exchanges of value for energy and energy for value by a vehicle may happen many thousands of times during a journey, taking advantage of energy value fluctuations and energy availability to obtain improved resource utilization. A vehicle may use data such as energy use efficiency, past energy values, past transaction data, and any other data to predict future energy usage and values in determining when and how to engage in exchanges of value for energy and energy for value. An ecosystem of such devices (e.g., roadways filled with vehicles engaging in smart contracts for energy and exchange) operating using the disclosed embodiments allows each such device to be an owner and a participant in the ecosystem and assist in optimizing the use of energy and financial resources.

Figure 6A:
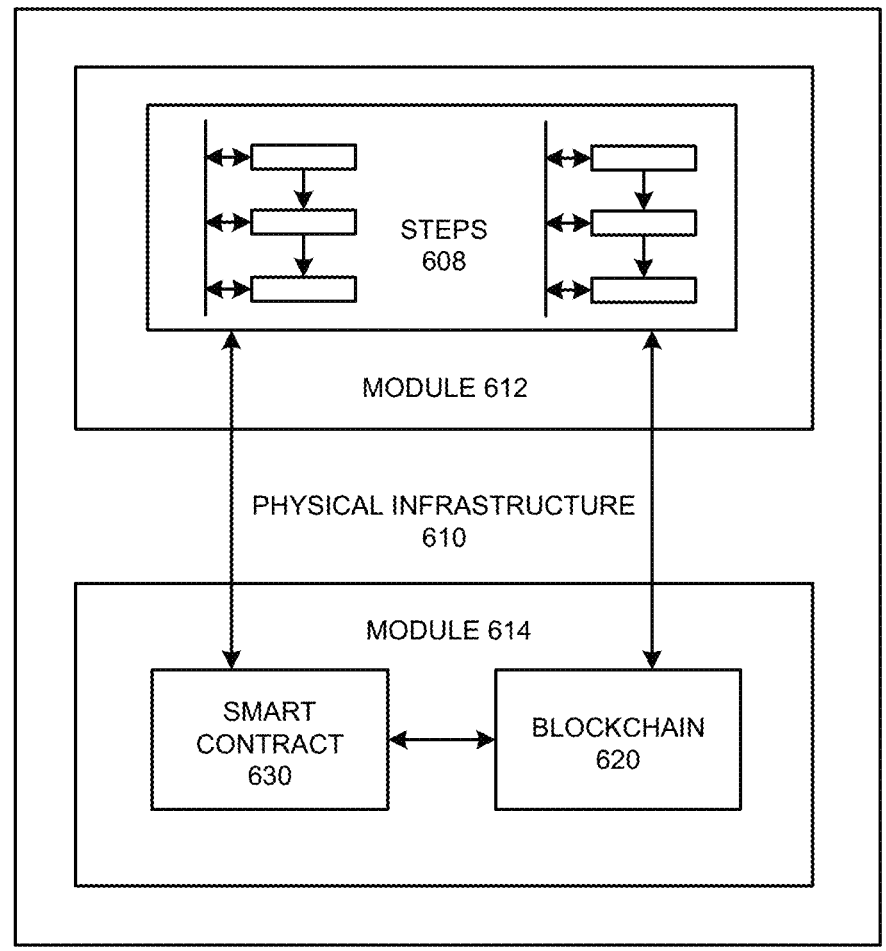
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
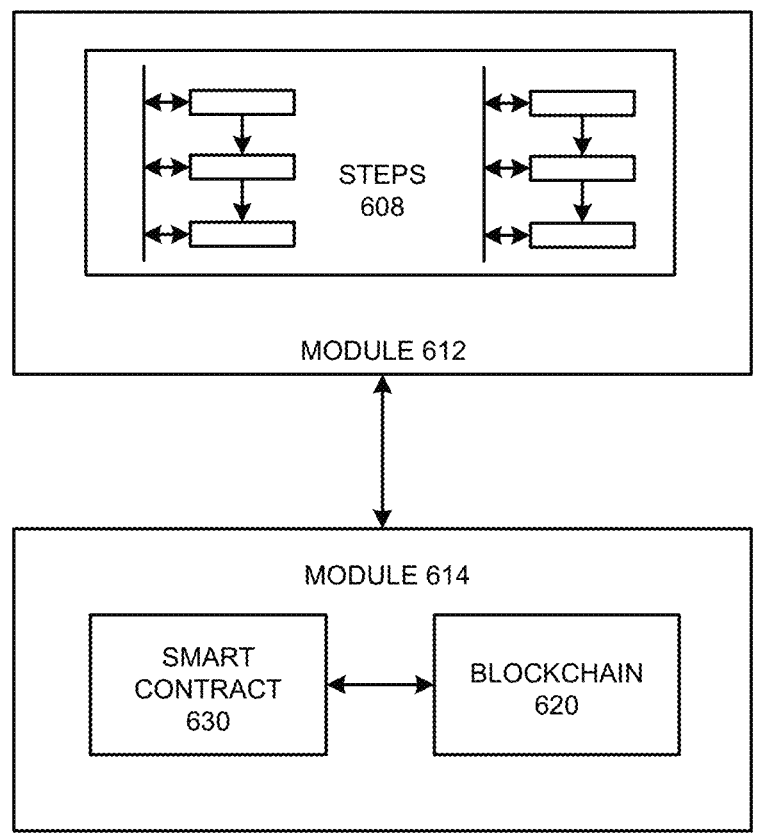
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
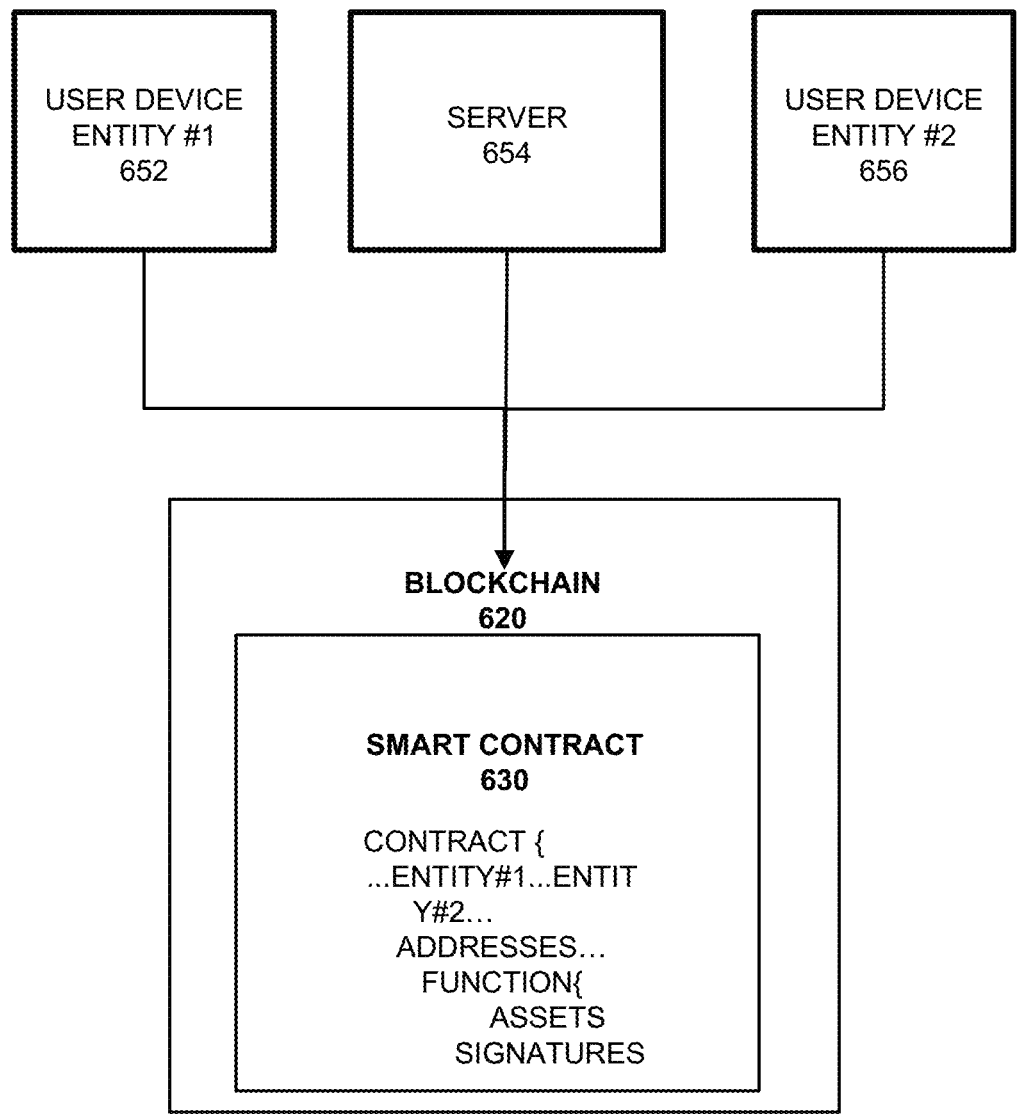
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
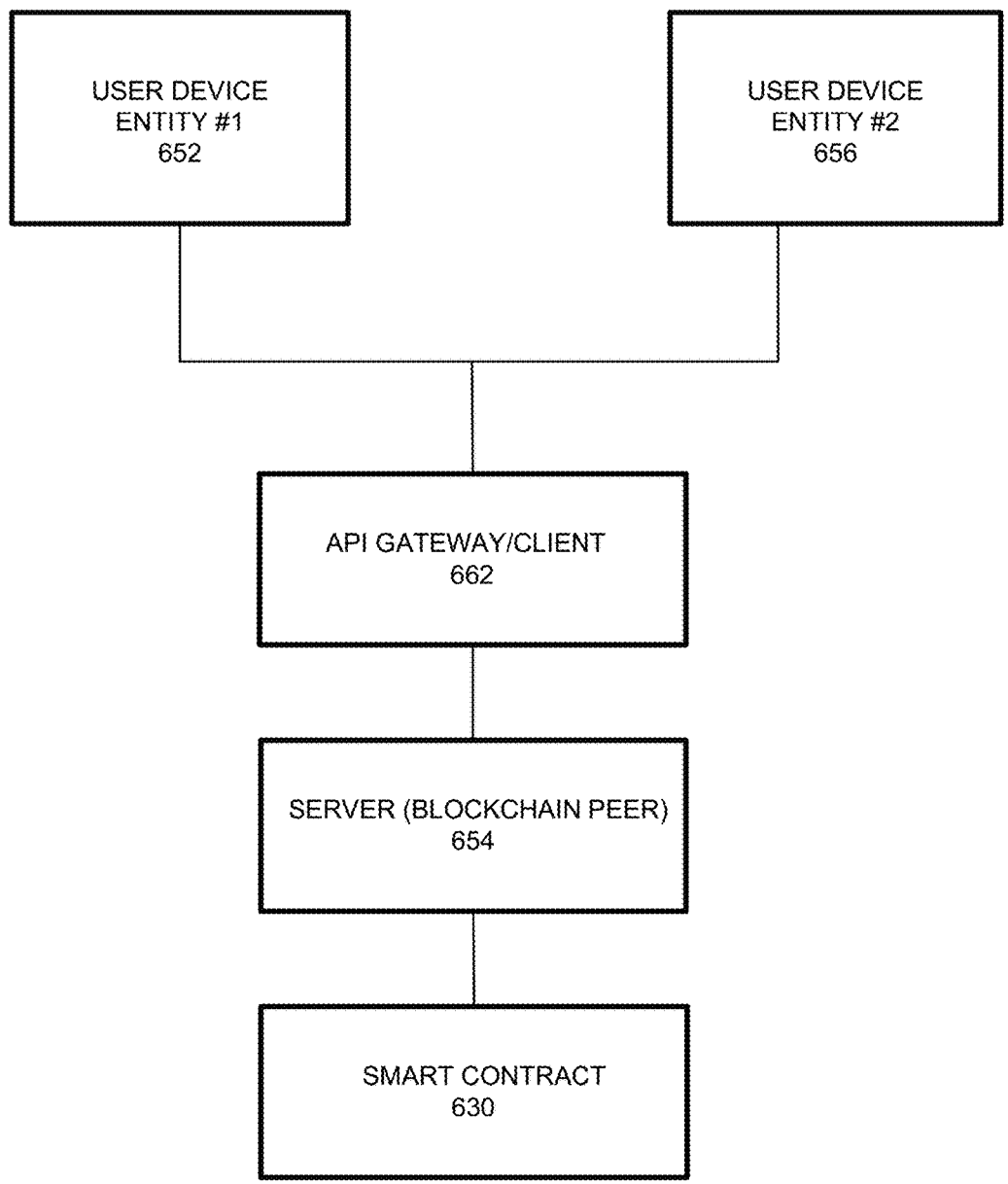
FIG. 6D illustrates another an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), DVD-ROM, flash storage, solid-state drive (SSD), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
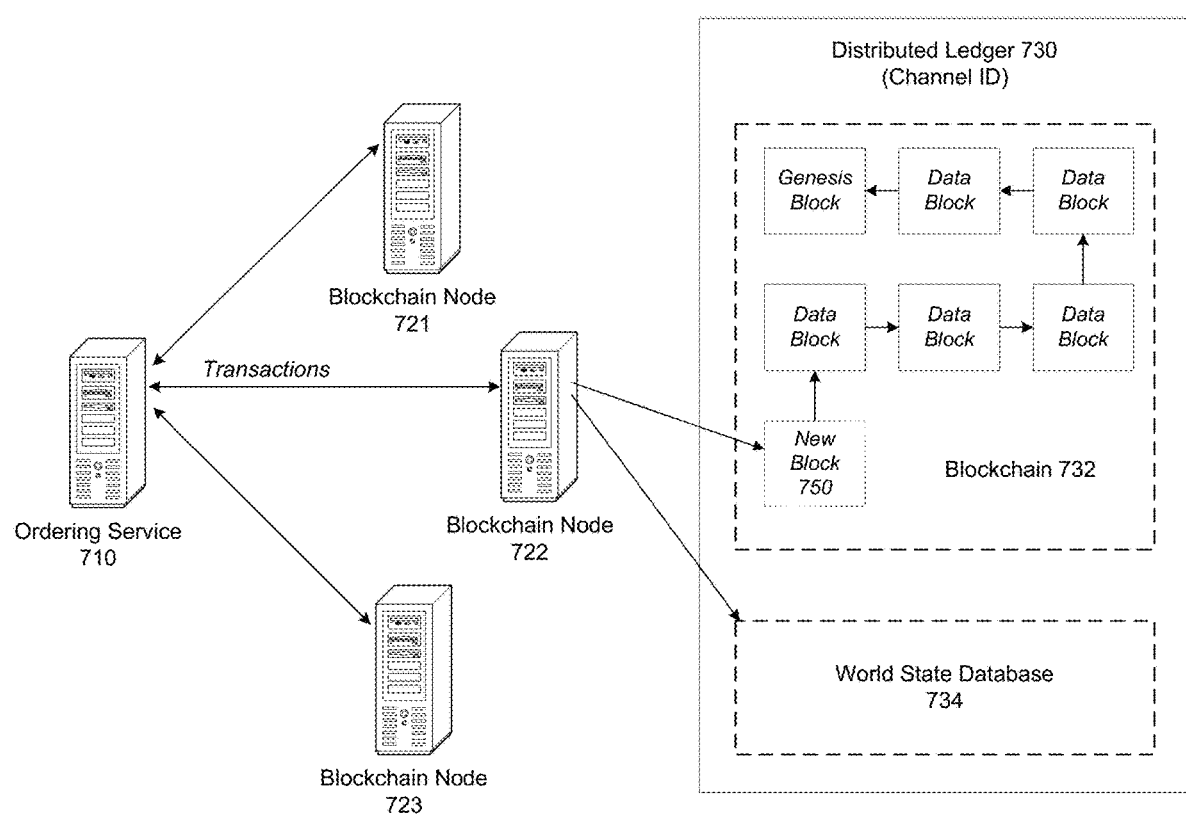
FIG. 7A illustrates a process of new data being added to a database, according to example embodiments.
Figure 7B:
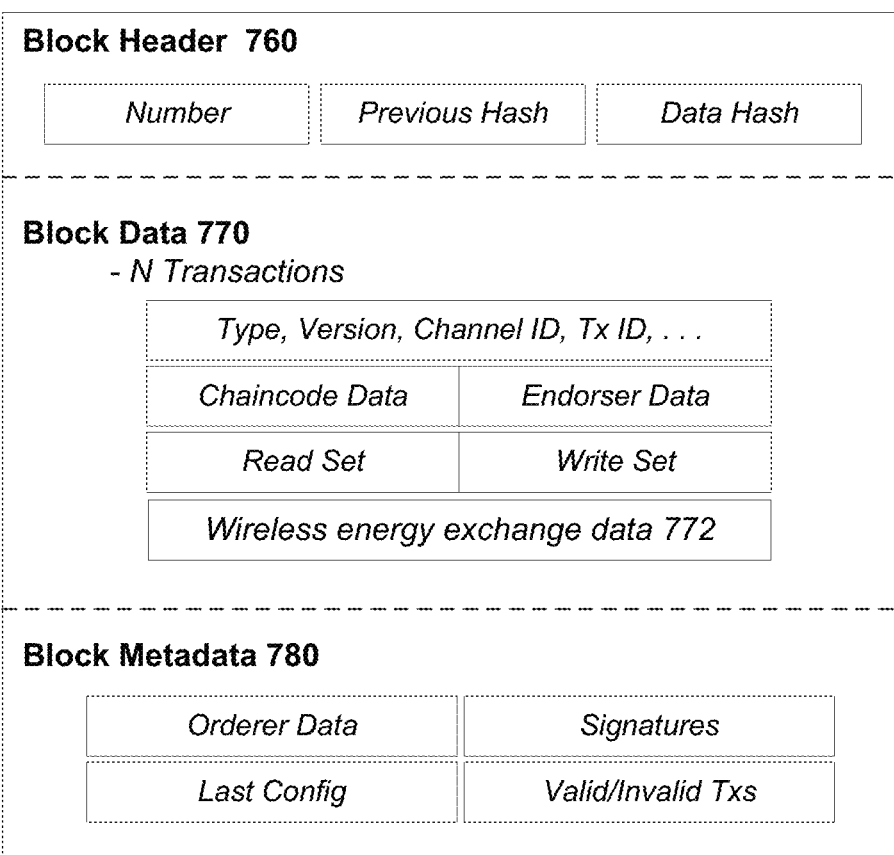
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's contents and/or header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's contents and/or header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730 (see FIG. 7A), a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store wireless energy exchange data 772 which adds additional information to the hash-linked chain of blocks in the blockchain 732 (see FIG. 7A). Accordingly, the data 772 can be stored in an immutable log of blocks on the distributed ledger 730 (see FIG. 7A). Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710 (see FIG. 7A). Meanwhile, a committer of the block (such as blockchain node 722 see FIG. 7A)) may add validity/ invalidity information based on an endorsement policy, verification of read/write sets, and the like. The transaction filter may include a byte array of a size equal to the number of transactions in the block data 770 and a validation code identifying whether a transaction was valid/invalid.

Figure 8:
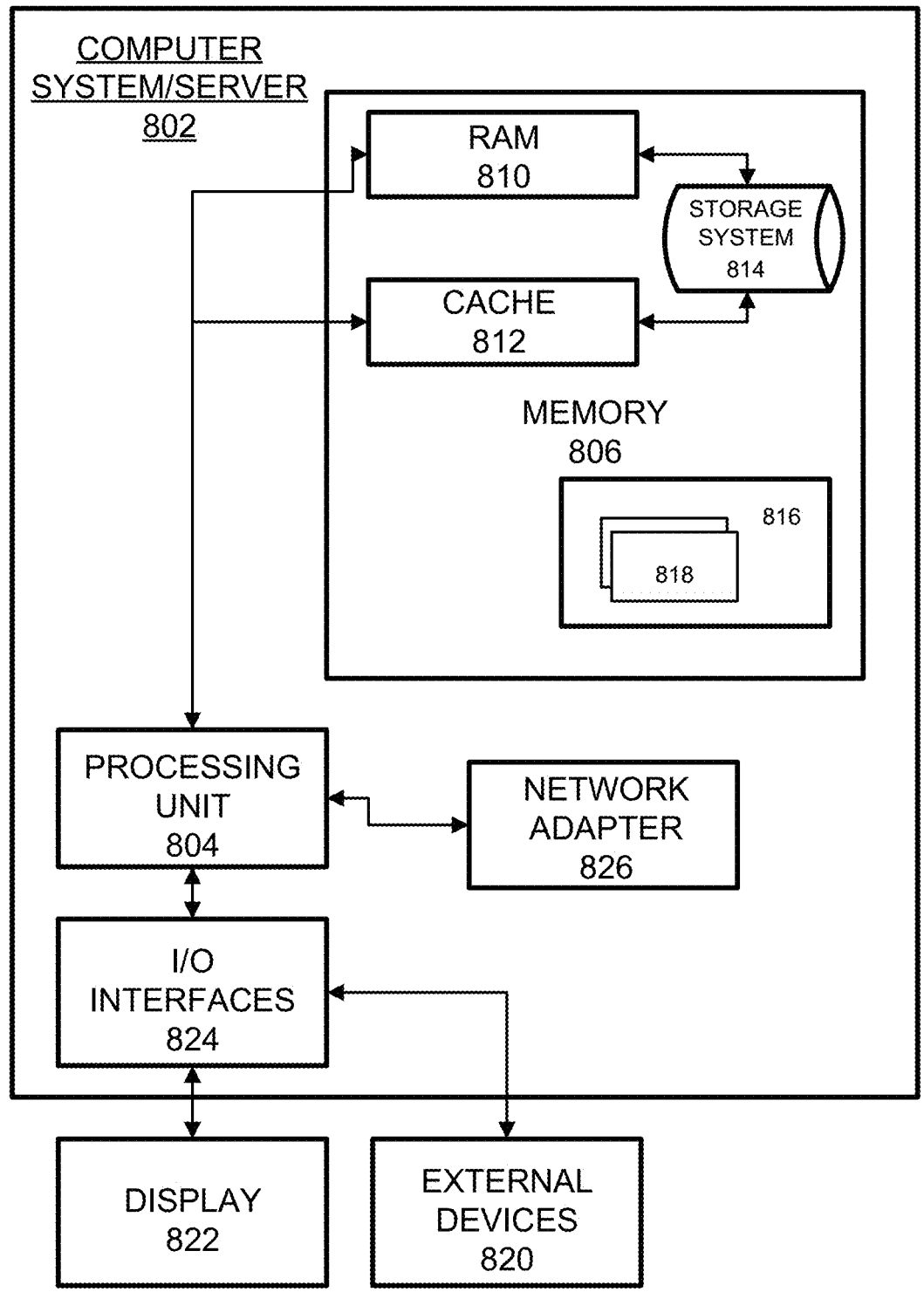
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include one or more program product having a set (e.g., one or more) of program modules that are configured to carry out the functions of various embodiments of the application.

Program/utility 816, having a set (one or more) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a receiver configured to receive wireless energy transfer information;
a transmitter configured to transmit a wireless energy transfer request to a blockchain; and
a processor configured to:
determine, based on the wireless energy transfer information, to perform a wireless energy exchange with a second vehicle,
wirelessly receive, via the vehicle, electric energy transferred from the second vehicle,
generate, via the vehicle, a confirmation of the wirelessly received electric energy which includes an identification of a smart contract of the blockchain and a value of energy that is wirelessly received during the transfer, and
store, via the vehicle, the confirmation within a data section of a blockchain block on the blockchain and store a unique identifier of the transfer of the wirelessly received electric energy within a header of the blockchain block.

2. The system of claim 1, wherein the wireless energy transfer request comprises one or more of:
an amount of value per unit of energy;
an amount of units of energy requested;
a window of time during which receipt of energy is requested; and
an amount of energy requested.

3. The system of claim 2, wherein the processor is further configured to:
place a total amount of value on hold, wherein the total amount of value on hold is a subset of the product of the amount of units of energy requested and the amount of value per unit of energy;
receive a subset of the amount of units of energy requested within the window of time; and
upon successful receipt of the subset of the amount of units of energy requested, release the total amount of value.

4. The system of claim 2, wherein the processor is further configured to:
determine an amount of value associated with each currently held unit of energy; and
determine that an amount of value associated with a subset of each currently held unit of energy is greater than the amount of value per unit of energy.

5. The system of claim 1, wherein the processor is further configured to transmit an offer to wirelessly transfer energy to another vehicle, wherein the offer comprises one or more of:
an amount of value per unit of energy;
an amount of units of energy available for transfer;
a window of time during which energy is available for transfer; and
an amount of energy available for transfer.

6. The system of claim 5, wherein the receiver is further configured to:
receive an indication of a total amount of value on hold, wherein the total amount of value on hold is a subset of the product of the amount of units of energy available for transfer and the amount of value per unit of energy, and
receive an indication that the total amount of value has been released; and
wherein the processor is further configured to wirelessly transfer a subset of the amount of units of energy available for transfer within the window of time.

7. The system of claim 1, wherein the processor is further configured to store a number of units of electric energy transferred from the second vehicle and a time of the energy transfer via a data block of the blockchain.

8. A method, comprising:
generating a wireless energy transfer request based on an energy state of a vehicle;
transmitting the wireless energy transfer request to a blockchain;
receiving wireless energy transfer information from a second vehicle;
determining to perform a wireless energy exchange with the second vehicle based on the wireless energy transfer information;
wirelessly receiving, via the vehicle, electric energy transferred from the second vehicle;
generating, via the vehicle, a confirmation of the wirelessly received electric energy which includes an identification of a smart contract of the blockchain and a value of energy that is wirelessly received during the transfer; and
storing, via the vehicle, the confirmation within a data section of a blockchain block on the blockchain and storing a unique identifier of the transfer of the wirelessly received electric energy within a header of the blockchain block.

9. The method of claim 8, wherein the wireless energy transfer request comprises one or more of:
an amount of value per unit of energy;
an amount of units of energy requested;
a window of time during which receipt of energy is requested; and
an amount of energy requested.

10. The method of claim 9, further comprising:
placing a total amount of value on hold, wherein the total amount of value on hold is a subset of the product of the amount of units of energy requested and the amount of value per unit of energy;
receiving a subset of the amount of units of energy requested within the window of time; and
upon successful receipt of the subset of the amount of units of energy requested, releasing the total amount of value.

11. The method of claim 9, further comprising:
determining an amount of value associated with each currently held unit of energy;

determining that an amount of value associated with a subset of each currently held unit of energy is greater than the amount of value per unit of energy; and based on determining that the amount of value associated with the subset of each currently held unit of energy is greater than the amount of value per unit of energy, determining to perform the wireless energy exchange with the second system.

12. The method of claim 8, further comprising transmitting an offer to wirelessly transfer energy to another vehicle, wherein the offer comprises one or more of:

an amount of value per unit of energy;

an amount of units of energy available for transfer;

a window of time during which energy is available for transfer; and an amount of energy available for transfer.

13. The method of claim 12, further comprising:

receiving an indication of a total amount of value on hold, wherein the total amount of value on hold is a subset of the product of the amount of units of energy available for transfer and the amount of value per unit of energy;

wirelessly transferring a subset of the amount of units of energy available for transfer within the window of time; and receiving an indication that the total amount of value has been released.

14. The method of claim 8, further comprising:

storing a number of units of electric energy transferred from the second vehicle and a time of the energy transfer via a data block of the blockchain.

15. A non-transitory computer readable medium comprising instructions, that when read by a processor, cause the processor to perform:

generating a wireless energy transfer request based on an energy state of a vehicle;

transmitting the wireless energy transfer request to a blockchain;

receiving wireless energy transfer information from a second vehicle;

determining to perform a wireless energy exchange with the second vehicle based on the wireless energy transfer information; and wirelessly receiving, via the vehicle, electric energy transferred from the second vehicle;

generating, via the vehicle, a confirmation of the wirelessly received electric energy which includes an identification of a smart contract of the blockchain and a value of energy that is wirelessly received during the transfer; and storing, via the vehicle, the confirmation within a data section of a blockchain block on the blockchain and storing a unique identifier of the transfer of the wirelessly received electric energy within a header of the blockchain block.

16. The non-transitory computer readable medium of claim 15, wherein the wireless energy transfer request comprises one or more of:

an amount of value per unit of energy;

an amount of units of energy requested;

a window of time during which receipt of energy is requested; and an amount of energy requested.

17. The non-transitory computer readable medium of claim 16, further comprising instructions, that when read by the processor, cause the processor to perform:

placing a total amount of value on hold, wherein the total amount of value on hold is a subset of the product of the amount of units of energy requested and the amount of value per unit of energy;

receiving a subset of the amount of units of energy requested within the window of time; and upon successful receipt of the subset of the amount of units of energy requested, releasing the total amount of value.

18. The non-transitory computer readable medium of claim 16, further comprising instructions, that when read by the processor, cause the processor to perform:

determining an amount of value associated with each currently held unit of energy;

determining that an amount of value associated with a subset of each currently held unit of energy is greater than the amount of value per unit of energy; and based on determining that the amount of value associated with the subset of each currently held unit of energy is greater than the amount of value per unit of energy, determining to perform the wireless energy exchange with the second system.

19. The non-transitory computer readable medium of claim 15, wherein the processor is configured for transmitting an offer to wirelessly transfer energy to another vehicle, wherein the wireless energy transfer request comprises one or more of:

an amount of value per unit of energy;

an amount of units of energy available for transfer;

a window of time during which energy is available for transfer; and an amount of energy available for transfer.

20. The non-transitory computer readable medium of claim 19, further comprising instructions, that when read by the processor, cause the processor to perform:

receiving an indication of a total amount of value on hold, wherein the total amount of value on hold is a subset of the product of the amount of units of energy available for transfer and the amount of value per unit of energy;

wirelessly transferring a subset of the amount of units of energy available for transfer within the window of time; and receiving an indication that the total amount of value has been released.

* * * * *